Patented June 8, 1943

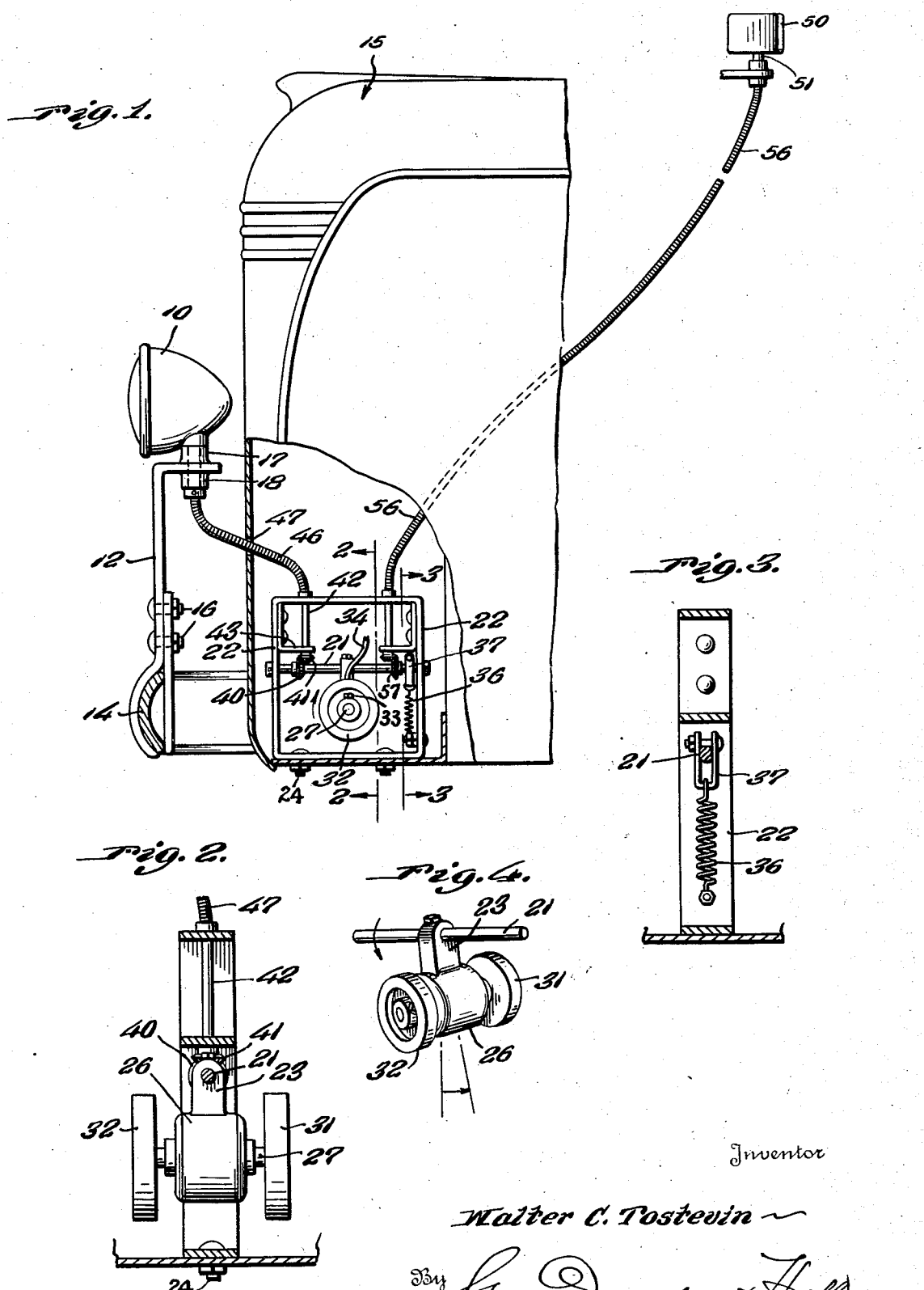

2,321,337

UNITED STATES PATENT OFFICE 2,321,337

APPARATUS FOR TURNING HEAD LAMPS

Walter C. Tostevin, Mandan, N. Dak.

Application May 14, 1942, Serial No. 442,977

8 Claims. (Cl. 240—62.2)

The present invention relates primarily to means for swinging a headlight of a vehicle when the vehicle turns or rounds a corner, and more specifically pertains to apparatus for turning any element on the vehicle which should be rotated or shifted during turning of the vehicle. The actuating means forming the subject matter of the present invention utilizes the principles of a pendulum and a gyroscope for turning the headlight on the vehicle so that the head lamp will be turned automatically without providing a mechanical connection with the steering mechanism of the vehicle.

The prior art includes many types of mechanisms for swinging a headlight of a vehicle either by means of centrifugal force or by inclination of the vehicle or by means of a driving connection between the steering mechanism and the head lamp. It is an object of the present invention to avoid apparatus employing any of such principles and to provide a mechanism or means for shifting the position of the headlight or any other element on the vehicle during the turning thereof without depending upon centrifugal force or the inclination of the vehicle or a driving connection between the steering mechanism and the element or headlight to be shifted.

A further object of the invention resides in providing a shaft or equivalent means which extends longitudinally of the vehicle having a pendulum suspended therefrom and at least one flywheel rotatably mounted on the pendulum so that the pendulum and the flywheel form means for turning the shaft to shift the position of the headlight during turning of the vehicle.

A still further object of the invention resides in providing means for shifting a headlight wherein a gyroscope forming a pendulum tends to maintain the headlight in a normal or neutral position during straight forward motion of the vehicle and during turning of the vehicle the gyroscope tending to maintain itself in the original rotating position shifts the pendulum to turn the headlight.

Other and further objects and features of the invention will be more apparent from a consideration of the accompanying drawing, and the following detailed description wherein an exemplary embodiment of the invention is disclosed.

In the drawing:

Figure 1 is an elevational view of a portion of a motor vehicle with parts thereof broken away illustrating the actuating means in elevation for shifting elements of the vehicle such as an auxiliary head light and a rear view mirror.

Fig. 2 is a sectional view taken on the line 2—2 of Fig. 1 illustrating the mounting of the combined pendulum and gyroscope.

Fig. 3 is a sectional view taken on the line 3—3 of Fig. 1.

Fig. 4 is a perspective view taken generally in the direction of the arrows associated with the line 2—2 of Fig. 1 illustrating the position of the flywheels and the pendulum when the vehicle turns in one direction or to the left in moving forward.

In carrying out the invention the means or a mechanism for actuating the shiftable elements of a vehicle may be mounted on any vehicle such as a locomotive, boat or an automobile as partly illustrated in Fig. 1. In an exemplary embodiment of the invention the actuating means for turning an auxiliary head lamp and a rear view mirror is mounted on any suitable part of a motor vehicle, as, for example, immediately in back of the grill work covering the radiator.

A head lamp such as an auxiliary light 10 is shifted or rotated when the motor vehicle diagrammatically represented at 15 turns or rounds a corner. The lamp may be supported by means of a bracket 12 mounted on a front bumper 14 of the car in any suitable manner such as by means of bolt and nut assemblies illustrated at 16 in Fig. 1. The lamp 10 is preferably mounted in a suitable bearing 17 so that the lamp housing is rotatably supported on a substantially vertical axis. A stub shaft 18 may therefore extend downwardly from the lamp housing through a bearing 17 as indicated in dotted lines in Fig. 1.

The actuating means for the lamp 10 is shown as including a substantially horizontally arranged shaft 21 or equivalent means which extends longitudinally of the vehicle or in the general direction of normal movement of the automobile. The shaft 21 is preferably arranged to be rotatable and secured in a fixed position with relation to the vehicle. For this purpose the shaft 21 may be rotatably mounted in a frame 22 so as to be rotated about the axis thereof. The frame 22 may be rigidly attached to some part of the car as by means of bolts 24. A pendulum formed primarily of a gyroscope is secured to and suspended from the shaft 21. For this purpose the pendulum may take the form of a depending arm 23 suitably secured to the shaft 21, and this arm supports means for driving a flywheel or flywheels of the gyroscope. Thus the driving means and the flywheel or flywheels provide sufficient weight at the lower end of the arm 23 to provide a pendulum. The driving means for the flywheels is supported by the pendulum arm 23 and may take the form of an electric motor 26 rigidly carried by the arm 23. Thus, considerable mass is concentrated at the lower end of the arm 23 so that this arm acts like a pendulum. A rotor shaft 27 of the motor 26 provides means for supporting and driving a pair of flywheels 31 and 32, but it is to be noted that a single flywheel may be used. These flywheels may be suitably keyed to the shaft 27 by means of a set screw 33.

The motor 26 may be of any suitable type such as a direct current motor supplied with current through leads 34 from the electrical supply system of the vehicle. The motor 26 preferably drives the flywheels 31 and 32 in the direction indicated by the arrow in Fig. 1. The weight of the motor 26 and the flywheels normally retain the arm 23 or pendulum in a substantially vertical or neutral position, but it may be advisable to include additional means for resiliently retaining the shaft 21 in a non-rotated or neutral position such as a spring 36 secured to one leg of the frame 22 for yieldably maintaining the combined pendulum and gyroscope in the neutral position. The spring 36 may be connected to the shaft 21 by means of a clamp 37 so that the spring 36 thus opposes rotation of the shaft 21 and assists in returning the shaft 21 to its original position.

A driving connection is provided between the shaft 21 and the stub shaft 18 and such a driving connection may take any suitable form and in the example illustrated includes a bevel gear 40 suitably secured to the shaft 21 and in meshing engagement with a second bevel gear 41 suitably attached to a short vertical shaft 42. The shaft 42 may be rotatably mounted in a bearing of the frame 22 and in a bearing carried by a bracket 43 attached to the frame 22. A flexible shaft arrangement 46 is provided to connect the shaft 42 with the stub shaft 18. The flexible shaft may be of any conventional type comprising a flexible shaft arranged within a flexible guiding and protecting sheath. The flexible cable assembly 46 may extend through a suitable opening 47 in the grill of the vehicle.

In operation and when the electric motor 26 is operating to drive the flywheels 31 and 32, these flywheels act like a gyroscope and tend to maintain the pendulum in a substantially vertical position, as illustrated in Fig. 2. The flywheels are thus rotating in substantially vertical planes which are substantially parallel to the normal straight forward movement of the vehicle. When the vehicle is moving in a substantially straight line forward and when the vehicle starts to round a bend or curve, the shaft 21 will translate with the vehicle since the frame 22 is rigidly secured to a part of the vehicle. If such turning of the vehicle is to the left of its straight forward movement, the shaft 21 will assume a position such as shown in Fig. 4. The rotating flywheels 31 and 32 will tend to maintain the arm 23 or pendulum in the position shown in Fig. 2 since these rotating masses oppose forces tending to move them out of their planes of rotation. The shaft 21, however, has been translated to the position indicated in Fig. 4 so that the flywheels 31 and 32 cannot remain in the original planes of rotation thereof. These flywheels in endeavoring to remain in their original planes of rotation assume the position illustrated in Fig. 4 so that the arm 23 is moved to the right as viewed in Fig. 4 to thereby rotate the shaft 21 in a counterclockwise direction. Such rotation of the shaft 21 will also drive the bevel gear 40 in a counterclockwise direction. The bevel gear 41 and the shaft 42 are thereby rotated to drive the flexible shaft 46 and turn the lamp 10 to the left whereby the beam of light projected thereby will no longer remain at a tangent to the turning movement of the car, but will swing to the left so that the roadway or path of movement in which the vehicle is turning will be illuminated.

After the vehicle again assumes a substantially straight forward movement or when the turn is completed the weight of the motor 26 and the flywheels will act in a pendulum-like manner on the shaft 21 to return the shaft to a neutral position such as illustrated in Fig. 2. The spring 36 will also assist in returning the shaft 21 to the neutral position. If the vehicle is then turned to the right of a normal substantially straight forward movement the shaft 21 will be rotated in an opposite direction by the action of the flywheels 31 and 32 swinging in a direction opposite to that hereinabove described. The lamp 10 will thereby be rotated by the flexible shaft 46 to project the beam of light to the right and illuminate the road bed or the path in which the vehicle is moving.

Other devices or elements on the vehicle which should be shifted during turning of the vehicle may be actuated by the combined pendulum and gyroscope. An example of such an element pertains to the rear view mirror as illustrated at 50 in Fig. 1. The rear view mirror may be mounted so as to be rotated as for example on a short vertical shaft 51 and this shaft may be driven by a second flexible shaft 56 operatively connected to the shaft 21. The flexible shaft 56 is preferably connected to the shaft 21 by means of beveled gears as indicated at 57. Thus, during turning of the vehicle and shifting of the combined pendulum and gyroscope in a manner as hereinabove described, the position of the rear view mirror 50 will likewise be turned so that vision of the roadway in back of the car will be improved.

While the invention has been described with reference to specific structural details, it will be appreciated that changes may be made therein by those skilled in the art. Such modifications may be made without departing from the spirit and scope of the invention as set forth in the appended claims. Thus the combined pendulum and gyroscope may be employed in various types of vehicles and for actuating various elements on such vehicles and all of these features are to be understood as coming within the scope of the present invention. It is to be further understood that the invention pertains primarily to apparatus embodying the principles of the pendulum and the gyroscope for swinging a shiftable element on a vehicle as the same turns, and manner of mounting and providing a driving connection between the pendulum and the element to be shifted may be varied without exceeding the bounds of the invention.

I claim:

1. In combination with a vehicle, a shaft extending longitudinally of the vehicle, an arm secured to and suspended from said shaft, a flywheel mounted on said arm below said shaft and in a fixed relation thereto rotating in a substantially vertical plane and substantially parallel to the normal movement of the vehicle whereby said flywheel tends to remain in said plane to rotate said shaft during turning of the vehicle, swingable means on the vehicle adapted to be rotated during turning thereof, and means providing a driving connection between said shaft and said swingable means.

2. Apparatus for turning a headlight of a vehicle comprising a substantially horizontal shaft rotatably mounted to extend in the general direction of forward movement of the vehicle, an arm attached to and hanging from said shaft, a flywheel mounted on said arm below said shaft in a fixed relation thereto rotating in substantially vertical plane and substantially parallel to the straight forward movement of the vehicle whereby the flywheel in endeavoring to remain in said plane swings the arm to rotate said shaft when the vehicle turns, and means providing a driving connection between said shaft and the head light.

3. Apparatus for shifting a head light of a vehicle comprising a substantially horizontal shaft rotatably mounted substantially parallel to straight forward movement of the vehicle, an arm secured to and extending downwardly from said shaft, a flywheel mounted on a lower portion of said arm and in a fixed relation to said arm for normal rotation in a substantially vertical plane and substantially parallel to said straight forward movement of the vehicle, means for driving said flywheel whereby the flywheel in tending to remain in said rotating plane moves said arm laterally to rotate said shaft during turning of the vehicle, and a driving connection between said shaft and said head light.

4. Apparatus for turning a head lamp of a motor vehicle comprising a substantially horizontal shaft, means supporting said shaft for rotation on said vehicle with the axis of the shaft fixed longitudinally of the vehicle, an arm secured to and depending from said shaft, an electric motor carried by said arm at a position below said shaft, a flywheel driven by said motor and normally rotating in a vertical plane substantially parallel to the axis of said shaft whereby the flywheel in endeavoring to remain in said plane of rotation moves said arm to rotate said shaft when the vehicle turns, means providing a driving connection between said shaft and said head lamp, and yieldable means opposing rotation of said shaft.

5. Apparatus for turning a head lamp of a motor vehicle comprising a substantially horizontal shaft, means supporting said shaft for rotation on said vehicle with the axis of the shaft fixed longitudinally of the vehicle, an arm secured to and depending from said shaft, an electric motor carried by said arm at a position below said shaft, a rotor shaft for said motor arranged at right angles to the first shaft, a flywheel mounted on said rotor shaft to rotate therewith in a substantially vertical plane whereby the rotating flywheel in attempting to remain in said plane moves said arm to rotate the first shaft when the vehicle turns, a flexible shaft connecting the first shaft to said head lamp, and yieldable means returning the first shaft to a neutral position.

6. Apparatus for turning a head lamp of a motor vehicle comprising a substantially horizontal shaft, means supporting said shaft for rotation on said vehicle with the axis of the shaft fixed longitudinally of the vehicle and adjacent a front portion thereof, an arm attached to and depending from said shaft, an electric motor rigidly mounted on a lower portion of said arm, a normally horizontal rotor shaft driven by said motor and arranged at right angles to the first shaft, a flywheel arranged on each side of the motor and secured to said rotor shaft, a bevel gear driven by the first shaft, a second bevel gear in mesh with the first gear, a rotatably supported head lamp, and a flexible shaft connecting the second bevel gear to said head lamp.

7. Apparatus for swinging a head lamp of a vehicle so as to project a beam of light in the direction in which the vehicle is turned comprising, an arm, means fixed to the vehicle supporting an upper end of said arm so that the lower end may swing at right angles to the longitudinal axis of the vehicle, a rotating flywheel mounted in a fixed manner on a lower portion of said arm for normal rotation in a substantially vertical plane substantially parallel to the longitudinal axis of the vehicle to maintain the arm in a substantially vertical position during substantially straight forward movement of the vehicle whereby said flywheel in tending to remain in said plane of rotation swings said arm during turning of the vehicle, a swingable head lamp, and means for transmitting movement of said arm to said head lamp.

8. Apparatus for swinging a head lamp of a vehicle so as to project the light emanating therefrom in the direction in which the vehicle is turned comprising, a vertically arranged arm, means fixed to the vehicle supporting an upper portion of said arm so that a lower portion thereof may swing only transversely of the vehicle, a fly-wheel, means fixed to the lower portion of said arm supporting said fly-wheel for rotation in a fixed relation to said arm and for normal rotation in a substantially vertical plane substantially parallel to the longitudinal axis of the vehicle to maintain said arm in said vertical position during substantially straight forward movement of the vehicle, whereby said arm is turned about the vertical axis thereof during lateral turning of the vehicle and said fly-wheel in tending to remain in said plane of rotation swinging said arm during lateral turning of the vehicle, a shiftable head lamp, and means for transmitting movement of said arm to said head lamp.

WALTER C. TOSTEVIN.